United States Patent [19]

Berz

[11] 4,026,687

[45] May 31, 1977

[54] DUST SEPARATOR ARRANGEMENT

[76] Inventor: Wolfgang Berz, Mauerkircherstr. 13, Munich 80, Germany, D-8000

[22] Filed: Feb. 12, 1976

[21] Appl. No.: 657,556

[30] Foreign Application Priority Data

Feb. 21, 1975 Germany .......................... 2507622
June 23, 1975 Germany .......................... 2527918

[52] U.S. Cl. ............................. 55/288; 55/303; 55/338; 55/343; 55/350; 55/494; 55/502; 55/503; 55/517

[51] Int. Cl.² ..................................... B01D 46/30

[58] Field of Search ............ 55/272, 273, 283, 286, 55/287, 288, 293, 301, 302, 303, 315, 319, 338, 343, 350, 484, 494, 502, 503, 511, 512, 517; 302/29

[56] References Cited

UNITED STATES PATENTS

| | | | |
|---|---|---|---|
| 2,788,087 | 4/1957 | Lenehan | 55/338 |
| 3,146,080 | 8/1964 | Ruble et al. | 55/315 |
| 3,266,225 | 8/1966 | Barr | 55/273 |
| 3,422,601 | 1/1969 | Kolb | 55/502 |
| 3,564,570 | 2/1977 | Lincoln et al. | 55/286 |
| 3,594,991 | 7/1971 | Berz et al. | 55/302 |
| 3,871,846 | 3/1975 | Berz et al. | 55/343 |

FOREIGN PATENTS OR APPLICATIONS 2,038,553 5/1972 Germany .......................... 55/350

*Primary Examiner*—Bernard Nozick
*Assistant Examiner*—David L. Lacey
*Attorney, Agent, or Firm*—Hans Berman

[57] ABSTRACT

In a dust separator arrangement including a battery of filter chambers, the cavity of each filter chamber is divided into an upper compartment and a lower compartment by a layer of filter medium. A tubular member has an upper orifice in the upper compartment and extends downwardly through the layer of filter medium to a lower orifice in an attached valve chamber. Two valve seats on the valve chamber define openings of the valve chamber permanently communicating with a raw gas manifold and a purging gas manifold respectively, while a purified gas manifold permanently communicates with the lower compartment, the manifolds being common to the several filter chambers. A single valve member mounted in each valve chamber may be moved between respective positions of sealing engagement with the two valve seats by an actuator.

9 Claims, 6 Drawing Figures

DUST SEPARATOR ARRANGEMENT

This invention relates to the purification of a carrier gas from suspended non-gaseous particles, and particularly to a dust separator arrangement in which solid particles may be removed from a carrier gas by passage of the gas through a layer of particulate filter medium.

In its more specific aspects, this invention is concerned with improvements in the apparatus described and claimed by me in United States Pat. No. 3,897,228. The apparatus of the earlier patent includes a battery of filter chambers whose cavities are each divided into an upper compartment and a lower compartment by a layer of filter medium. A tubular member passes from the upper compartment through the filter layer and the lower compartment into a purging gas manifold. The upper compartments are connected with a raw gas manifold, and the lower compartments permanently communicate with a purified gas manifold. Two valves are associated with each filter chamber for alternatively sealing the tubular member or the connection between the upper compartment and the raw gas manifold.

By suitably manipulating the two valves, the filter chambers may be operated in a filtering mode or in a purging mode. For filtering, the tubular member is blocked, and raw gas is drawn from the raw gas manifold into the upper compartment, downwardly through the layer of filter medium which retains suspended solid particles, and discharged from the lower compartment into the purified gas conduit. During operation in the purging mode, the connection to the raw gas manifold is blocked, purified gas is drawn into the lower compartment, upwardly through the layer of filter medium to dislodge and entrain previously deposited dust particles, and the resulting purging gas carrying suspended dust particles is discharged from the tubular member into the purging gas manifold. Of the several chambers, at least one is operated in the purging mode while the others are employed for filtering, thereby ensuring continuous operation.

While the known apparatus has been operated successfully, it relies on proper synchronization of two valves associated with the same filter chamber, and is subject to serious malfunction in the event of a breakdown in the valve operating mechanism. It is an important object of this invention to improve the reliability of the known apparatus briefly described above, and particularly to reduce the chances for malfunctioning of the valve controls.

With this object and others in view, as will hereinafter become apparent, each filter chamber in the improved dust separator arrangement of this invention is provided with a valve chamber communicating with the lower orifice of the tubular member. First and second valve seats on the valve chamber define openings of the same which communicate with the raw gas conduit and the purging gas conduit respectively, and may be sealed alternatively by a single valve member movably mounted in the valve chamber. No other valves are needed, whereby the reliability of the apparatus is significantly improved in a very simple manner.

Other features, additional objects, and many of the attendant advantages of this invention will readily be appreciated as the same becomes better understood by reference to the following detailed description of preferred embodiments when considered in connection with the appended drawing in which.

Figure 1:
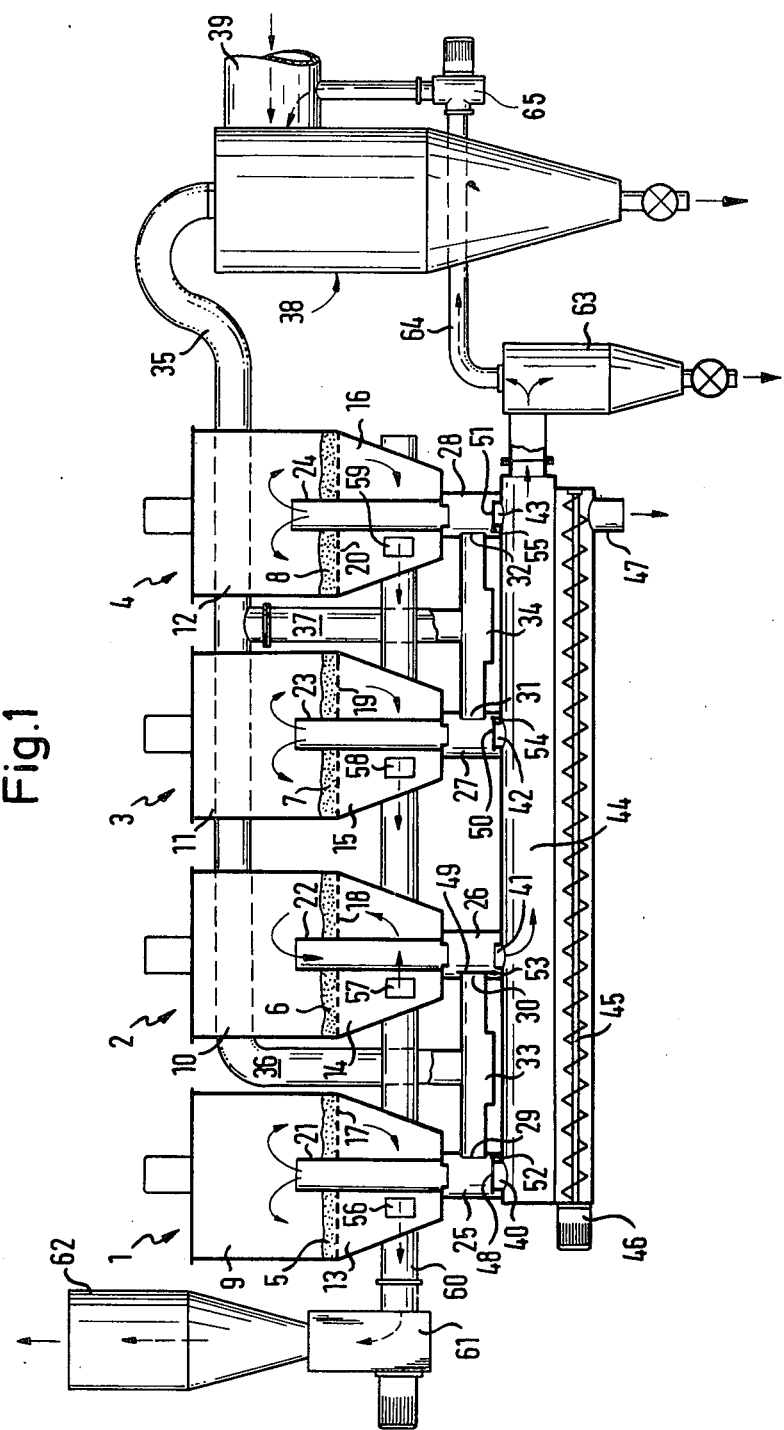
FIG. 1 shows a dust separator arrangement of the invention in elevational section.

Referring initially to FIG. 1, there is seen a dust collector arrangement many of whose elements are known from the afore-mentioned patent and illustrated in FIG. 1 of the patent. A battery of four upright, cylindrical filter chambers 1, 2, 3, 4, identical in structure and function, is provided with respective horizontal layers 5, 6, 7, 8 of fine gravel serving as a filter medium and axially dividing the cavities of the filter chambers into respective upper compartments 9, 10, 11, 12 and lower compartments 13, 14, 15, 16. The filtering layers of particulate material are supported on respective foraminous partitions 17, 18, 19, 20.

Cylindrical tubes 21, 22, 23, 24 are coaxially mounted in the several filter chambers. Their upper orifices are permanently open toward the respective upper compartments in which they are located. Each tube passes downward from its upper orifice through a layer of filtering medium and a lower compartment into a valve chamber 25, 26, 27, 28 attached to the outside of the associated filter chamber and thereby to the associated tube whose open lower orifice is located in the valve chamber.

First valve seats 29, 30, 31, 32 on the vertical, axial walls of respective valve chambers define openings in the valve chambers which communicate with outlets 33, 34 on branches 36, 37 of a raw gas manifold 35. The manifold 35 receives raw gas from a cyclone separator 38 in which the coarsest particles are stripped from a carrier gas entering the cyclone separator 38 through a supply duct 39.

Each valve chamber 25, 26, 27, 28 has a second valve seat 40, 41, 42, 43 on its horizontal bottom wall, and the opening defined by the valve seat downwardly communicates with a horizontal purging gas manifold 44. As is known from the earlier patent, a screw conveyor 45 in the manifold 44 is driven by an electric motor 46 and discharges dust accumulating in the manifold through a pipe 47 near one end of the manifold.

Valve flaps 48, 49, 50, 51 are fixedly mounted in the chambers 25, 26, 27, 28 on respective pivot pins 52, 53, 54, 55. The pivot pins are elements of individual drive mechanisms 52a, 53a, etc., partly indicated in FIG. 4, which each include a solenoid actuator and a return spring for turning the pivots with the attached valve flaps through 90° between respective positions of sealing engagement with the associated first and second valve seats. In each of FIGS. 1 to 3, the first valve seat 30 is sealed by the valve flap 49 in the valve chamber 26 attached to the filter chamber 2, while in all other valve chambers the second valve seats 40, 42, 43 are blocked.

Orifices 56, 57, 58, 59 of the lower compartments 13, 14, 15, 16 are permanently open toward a pure gas manifold 60. An electrically driven, rotary blower 61 draws purified gas from the lower compartments of the several filter chambers operating in the filtering mode and conveys the purified gas to the atmosphere through a stack 62. The structure described so far is common to the dust separator arrangements illustrated in FIGS. 1 to 4, details being better visible in FIG. 4 which shows the second valve seat 40 of the filter chamber 1 open toward the purging gas manifold 44 while the valve flap 49 in the valve chamber 26 attached to the filter chamber 2 closes the second valve seat 41 so that the filter chamber 1 operates in the purging mode, as will presently be described in more detail.

In the arrangement shown in FIG. 1, a cyclone separator 63 receives gas from the purging gas manifold 44 for collecting dust particles not deposited in the manifold 44, gas being drawn sequentially from the lower compartment 14 of the filter chamber 2 through the layer 6 of filter medium, the tube 22, the valve chamber 26, the purging gas manifold 44, the cyclone separator 63, and a connecting conduit 64 by a blower 65 powerful enough to overcome the suction of the blower 61 in the compartment 14. The discharge pipe of the blower 65 is connected to the supply duct 39.

When the valve flaps 48, 49, 50, 51 are positioned as shown in FIG. 1, raw gas is drawn from the supply duct 39 by the blower 61 through the cyclone separator 38 and the raw gas manifold 35 into the valve chambers 25, 27, 28, thence through the tubes 21, 23, 24, into the upper compartments 9, 11, 12 of the filter chambers 1, 3, 4 which operate in the filtering mode, and the purified gas released from the layers 5, 7, 8 into the lower compartments 13, 15, 16 is ultimately blown out of the stack 62. The coarsest dust particles are removed from the raw gas in the cyclone separator 38 and discharged from the same continuously or intermittently, as is conventional.

The several layers of filter medium are stripped of accumulated fine dust particles by counter-current purging as shown with reference to filter chamber 2 in FIG. 1. Pure gas drawn upward through the layer 6 of filter medium entrains dust particles and carries them in a straight and vertically downward path from the upper compartment 10 through the tube 22, the valve chamber 26, the second valve seat 41 into the purging gas manifold 44, where the gas stream is deflected 90° into a horizontal path, causing deposition of much of the entrained solids on the screw conveyor 45. Additional particles are removed in the cyclone separator 63, and others may be precipitated together with the coarse fraction in the raw gas in the separator 38.

While the pivot pins 52, 53, 54, 55 may be turned manually as needed to operate the filter chambers 1, 2, 3, 4 partly in the filtering mode and partly in the purging mode at any given time, it is more advantageous to switch each filter chamber between its operating modes by means of a timing switch, common to all four chambers, and individual relays and electrically operated actuators for the pivot pins operating against return springs. Since only a single valve is associated with each filter chamber and is biased toward one of its operating positions by the return spring, which is virtually immune to malfunctioning, reliability of the dust separator arrangement is not affected by valves and their drive mechanisms and controls.

Figure 2:
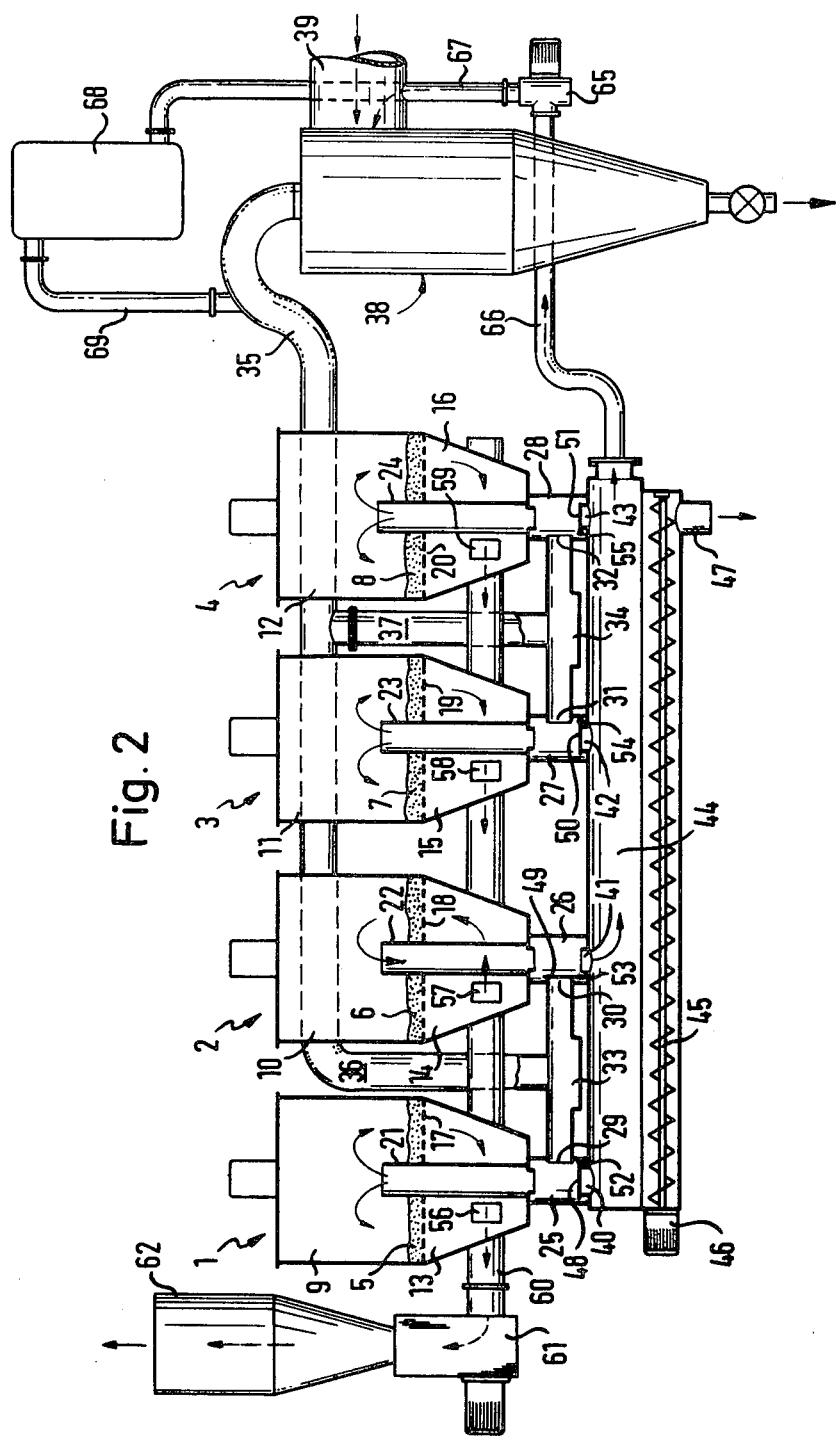
FIGS. 2 and 3 illustrate modifications of the apparatus of FIG. 1 in corresponding views.
Figure 3:
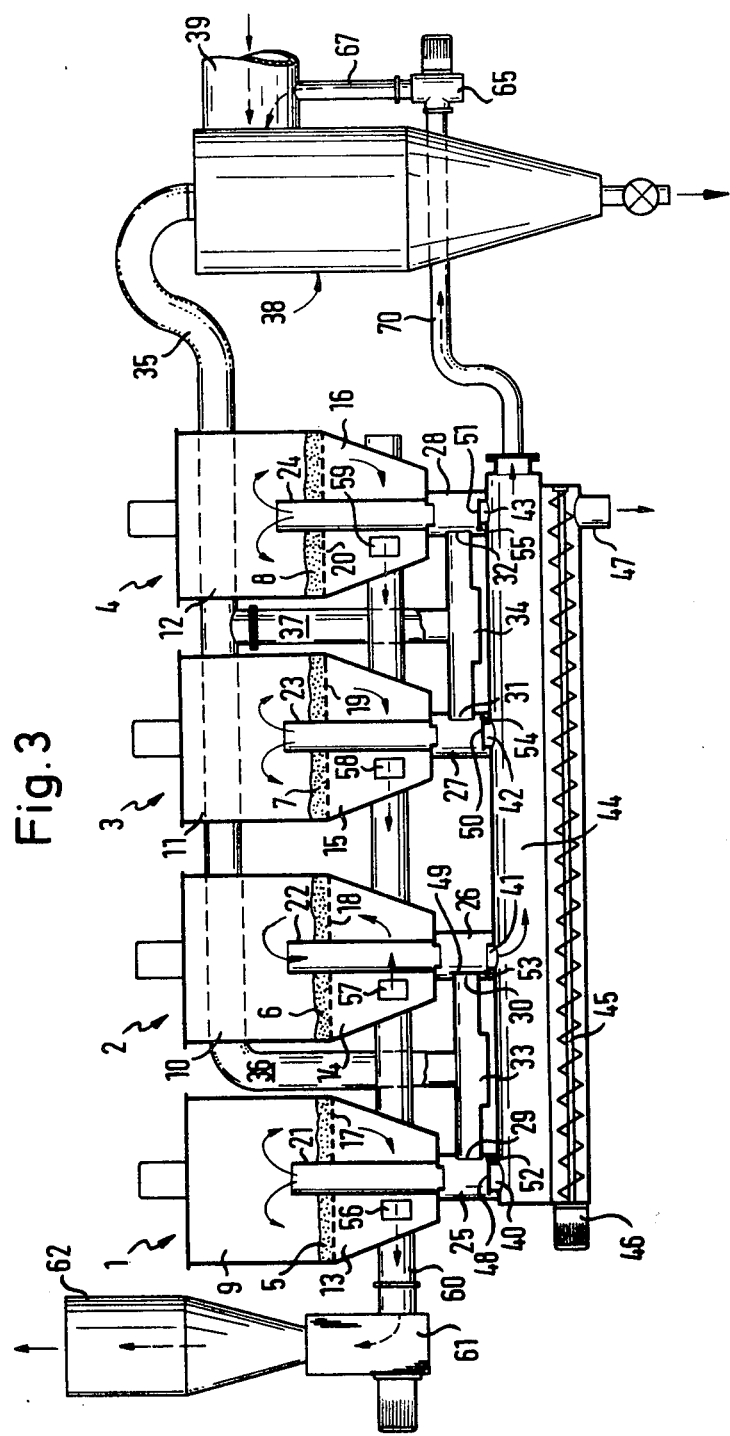
Figure 4:
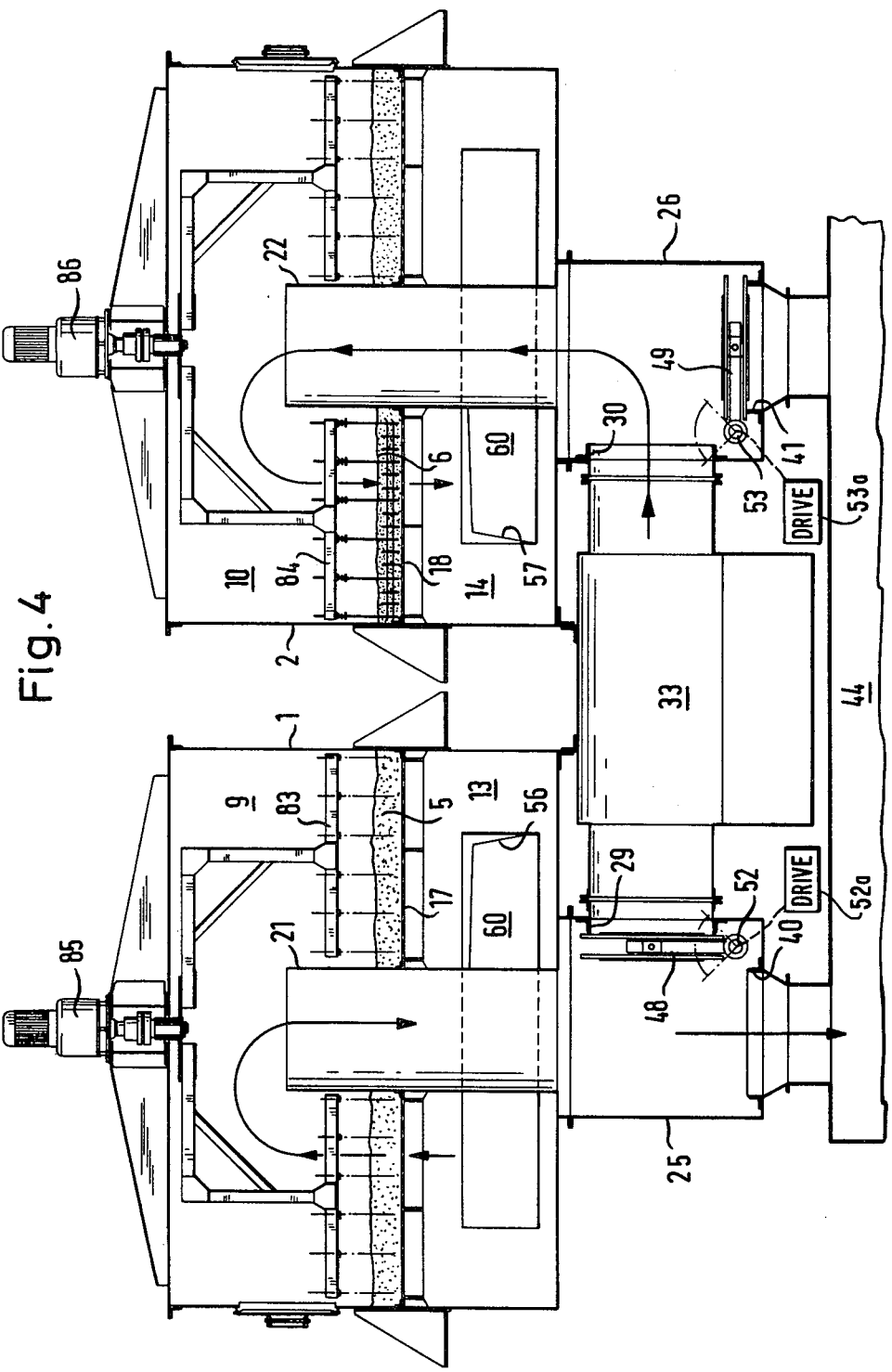
FIG. 4 shows a portion common to the apparatus of FIGS. 1 to 3 in a different operating condition and on a larger scale.

The arrangement illustrated in FIGS. 2 and 3 differs from the apparatus described above with reference to FIGS. 1 and 4 only in the manner in which the purging gas drawn from the manifold 44 by the blower 65 is stripped of suspended solids and returned to the filter chambers 1, 2, 3, 4. As is shown in FIG. 2, the blower 65 may be connected directly to the manifold 44 by the conduit 66, and its pressure outlet 67 connected to the raw gas manifold 35 through a separator 68 and a conduit 69 by-passing the cyclone separator 38. The separator 68 may be a cyclone, a scrubber, an electrostatic precipitator, or a filter employing a wet filter medium or a dry filter medium such as tubes of fabric. In the embodiment of FIG. 3, the blower 65 is arranged in a conduit 70 which leads from the manifold 44 directly to the supply duct 39, thereby relying on the cyclone separator 38 and on the several filter chambers operating in the filtering mode for removing dust particles entrained from a purged filtering layer and not precipitated by turbulence in the purging gas manifold 44.

Figure 5:
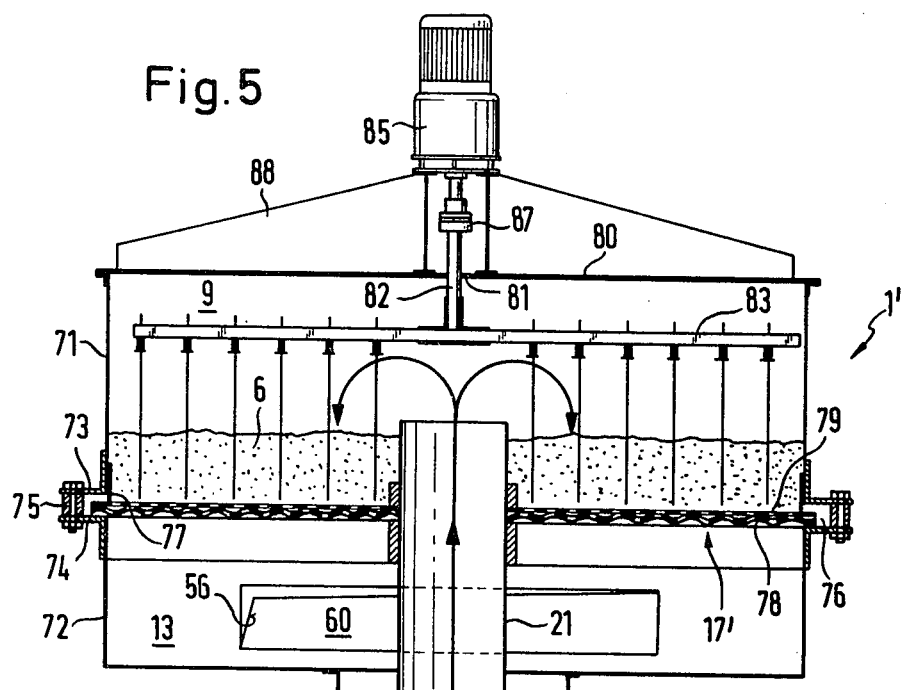
FIG. 5 is a further enlarged view of a modified part of the device of FIG. 4.
Figure 6:
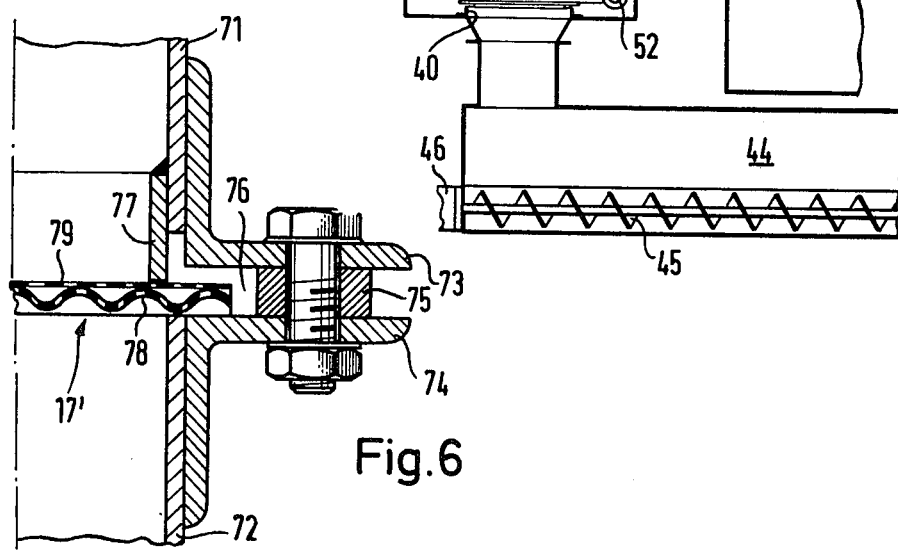
FIG. 6 shows a detail of the apparatus of FIG. 5 on yet a larger scale.

FIGS. 5 and 6 illustrate an improved shell construction for the several filter chambers in the dust separator arrangements of FIGS. 1 to 4. The modified filter chamber 1' and associated devices are identical with the afore-described embodiments of the invention as far as not specifically shown and described otherwise. The outer shell of the filter chamber 1' consists of an upper part 71 and a lower part 72 having each the shape of a dish or cup and joined by bolted flanges 73, 74 which project radially outward from the rim portions of the parts 71, 72. A flat spacer ring 75 is clamped between the flanges and is so dimensioned that an annular recess 76, open in a radially inward direction toward the common axis of the shell parts 71, 72, is defined by the flanges 73, 74 and the ring 75.

A cylindrical apron 77 depends from the cylindrical, inner face of the shell part 71 to prevent entry of filter medium into the recess 76 in which the circular, outer rim of the foraminous partition 17' is received with sufficient clearance to permit the limited movement of the partition caused by thermal expansion and contraction without buckling of the partition. The partition consists of a corrugated, apertured, backing plate 78 resting on the flange 74 and a flat, perforated carrier sheet 79 supporting the layer 6 of fine gravel and movably engaged by the apron 77.

Because none of the manifolds 35, 44, 60 directly communicates with the upper compartment 9 in the shell part 71, the upper shell part consists of a cylindrical, imperforate, flanged sheet metal wall welded to a flat radial wall 80 of the same material to form a unitary, inverted cup shape. A central opening in the wall 80, which constitutes the bottom of the cup shape, is sealed by a coaxial drive shaft 82 and packings, not specifically illustrated. A rake 83 is mounted on the shaft for agitating the filter medium 6 when the filter chamber 1' is operating in the purging mode. As is shown only in FIG. 4, driven rakes 83, 84, conventional in themselves, are also provided in the filter chambers 1, 2, 3, 4, and are each driven by an electric motor 85, 86 connected to a drive shaft 82 by a flexible coupling 87. Brackets 88 welded to the outer faces of the walls 80 support the motors 85, 86.

Because the partition 17' is supported on the flange 74, the effective filtering area is equal to the entire cross section of the filter chamber, and no allowance in filter chamber dimensions need be made for filter areas rendered ineffective by supporting structure such as brackets projecting inward from the axial filter chamber walls. For equal filtering capacity, the modified filter chamber 1' is thus smaller, lighter, and less costly to build than filter chambers used heretofore in dust separating arrangements of the same general type.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:
1. A dust separator arrangement comprising:
   a. a plurality of filter chambers bounding respective cavities therein;
   b. a layer of filter medium dividing each cavity into an upper compartment and a lower compartment;
   c. a tubular member positioned in each filter chamber, each member having an upper orifice and a lower orifice,
      1. said upper orifice being open toward the upper compartment of each filter chamber,
      2. said member extending downwardly from said upper compartment through the layer of filter medium in each filter chamber;
   d. a plurality of valve means attached to said tubular members respectively, each valve means including
      1. a valve chamber communicating with said lower orifice of the attached tubular member,
      2. a first valve seat and a second valve seat on said valve chamber defining respective openings of the same,
      3. a valve member movably mounted in said valve chamber, and
      4. drive means for moving said valve member between respective positions of engagement with said valve seats in which the valve member blocks the openings defined by the respective engaged valve seats;
   e. a raw gas conduit in flow communication with the openings defined by each of said first valve seats;
   f. a purging gas conduit in flow communication with the openings defined by each of said second valve seats;
   g. a purified gas conduit in flow communication with each of said lower compartments; and
   h. conveying means respectively communicating with each of said conduits for conveying raw gas into said valve chambers and purified gas out of said lower compartments when the associated valve members engage said second valve seats, and for conveying purified gas from said purified gas conduit through said lower compartments, said layers, said tubular members, and out of said valve chambers as a purging gas when the associated valve members engage said first valve seats.

2. An arrangement as set forth in claim 1, wherein each of said valve chambers has two walls angularly offset from each other and containing said openings respectively, said drive means including means for pivoting said valve member between said positions thereof.

3. An arrangement as set forth in claim 2, wherein said tubular members, said valve chambers, and said second valve seats constitute successive portions of respective flow conduits leading continuously downward from said upper compartments to said purging gas conduit.

4. An arrangement as set forth in claim 3, wherein said flow conduits are substantially straight and vertical.

5. An arrangement as set forth in claim 1, wherein each of said filter chambers includes an upper shell portion and a lower shell portion, a flange on each shell portion, fastening means connecting said flanges, and a foraminous partition supported on the flange of said lower shell portion, said filter medium being particulate and resting on said partition.

6. An arrangement as set forth in claim 5, wherein said fastening means include a spacer element interposed between the flanges of said upper and lower shell portions and defining a recess between said flanges, said partition being received in said recess with sufficient clearance to permit limited movement of said partition relative to said shell portions.

7. An arrangement as set forth in claim 6, further comprising an apron member depending from said upper shell portion toward said partition for preventing entry of said filter medium into said recess.

8. An arrangement as set forth in claim 6, wherein said flanges project from said shell portions outward of said cavity, said recess being open inward of said cavity.

9. An arrangement as set forth in claim 5, wherein said upper shell portion is a unitary body having the approximate shape of an inverted cup having a bottom and a rim, said bottom upwardly bounding said upper compartment, said flanges projecting from said rim outward of said cavity.

* * * * *